UNITED STATES PATENT OFFICE.

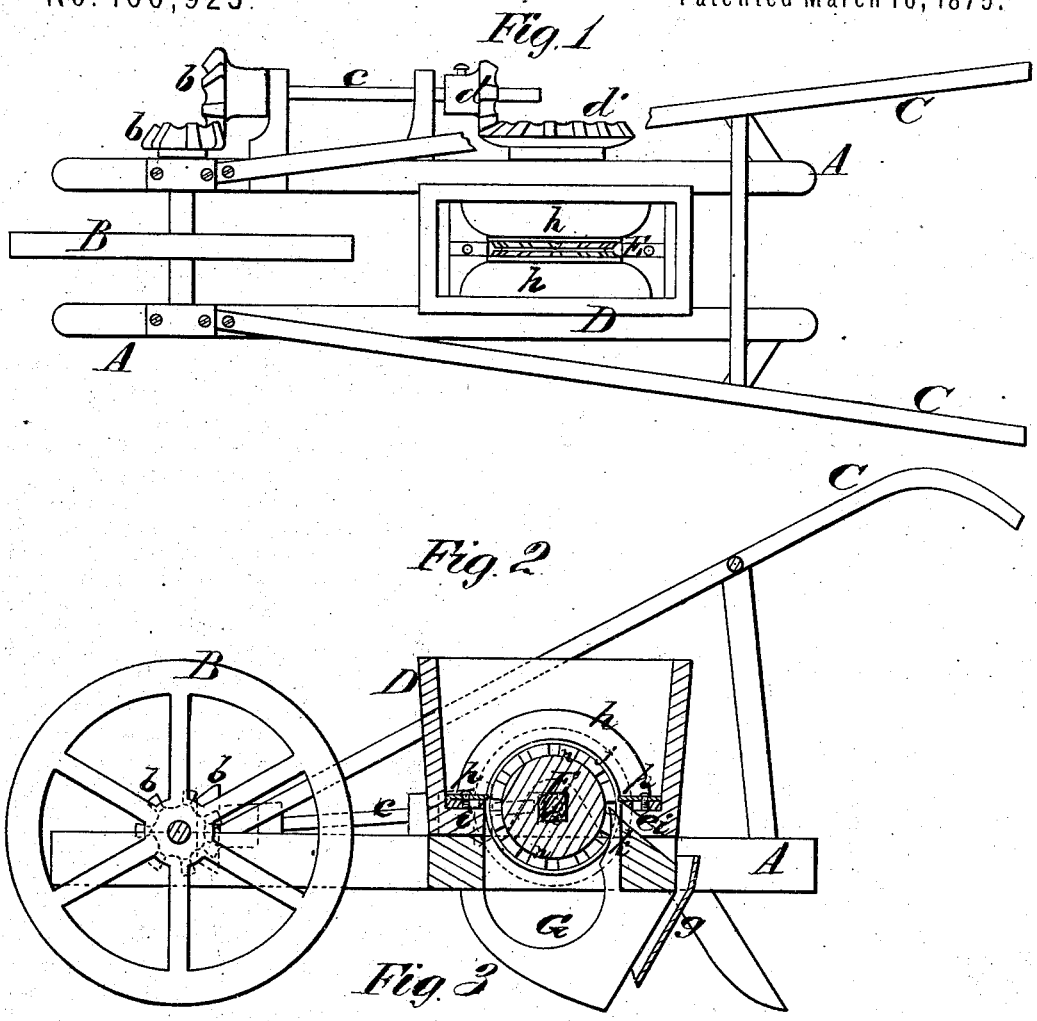

JAMES B. LUDLOW, OF MUNCIE, INDIANA.

IMPROVEMENT IN CORN-DRILLS.

Specification forming part of Letters Patent No. 160,923, dated March 16, 1875; application filed January 30, 1875.

*To all whom it may concern:*

Be it known that I, JAMES B. LUDLOW, of Muncie, in the county of Delaware and State of Indiana, have invented a new and valuable Improvement in Corn-Drills; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a plan view of my machine, and Fig. 2 is a longitudinal vertical sectional view of the same. Fig. 3 is a sectional detail view.

This invention has relation to corn-planters, and especially to planters having rotary dropping-wheels, such, for instance, as the machine which is described in the schedule annexed to Letters Patent numbered 157,342. The nature of my invention consists in a clearing-finger, which is formed on the rear upper end of the drill-opener, in combination with a dropping-wheel whose cells are intersected by an annular groove which receives said finger.

In the annexed drawings, A designates the frame of the planter, which is mounted on a wheel, B, and provided with handles C C. D designates a hopper, and E a dropping-wheel, which latter is fast on a horizontal shaft, $a$, having its bearings in boxes on frame A. The wheel E receives rotation from the wheel B through the medium of beveled spur-wheels $b\,b$, shaft $c$, and beveled spur-wheels $d\,d'$. The wheel $d$ is endwise adjustable on its shaft $c$, for the purpose of engaging it with either one of several concentric series of teeth on the face of the wheel $d'$. A passage is made through the rear end of the hopper, as shown at $e'$, through which the charges of seed flow, and are conducted into the ground by means of a tube, $g$, at the rear edge of a drill-opener, G, shown in Fig. 2. On the inner sides of the hopper D are two arches, $h\,h$, which are nearly semicircular, and which are supported upon cross-pieces $i\,i$ at the ends and bottom of the hopper. These arches are convex in cross-sections, and the two convex surfaces are directed toward the periphery of the dropping-wheel E for the purpose of keeping the seed in the hopper upon said wheel whether the quantity be large or small. The periphery of the wheel E is concave laterally, which leaves two side flanges, $j\,j$, which prevents the chaff from getting between the wheel and the arches. The wheel E has seed-cells in its periphery, arranged at regular distances apart, and intersected by an annular groove, $n$, which is as deep as the said cells, and in which extends the angular end of a clearer, $k$. This clearer, or, more properly speaking, discharger, is formed on the rear upper end of the drill-opener G, and is sustained in its proper place by means of a cross-piece of the frame A. This discharger insures the discharge of the seed from their cells at the proper place and time. The india-rubber strikers $p\,p$ are secured to adjustable pieces $r\,r$, which allow the ends of the rubber to be set up to the periphery of the wheel E as they wear away.

What I claim as new, and desire to secure by Letters Patent, is—

The clearing-finger $k$, formed on the upper rear end of the drill-opener G, in combination with the dropping-wheel E, provided with seed-cells intersected by an annular groove, as and for the purpose set forth.

In testimony that I claim the above I have hereunto subscribed my name in the presence of two witnesses.

JAMES B. LUDLOW.

Witnesses:
GEO. W. SPILKER,
WILL. M. MARSH.